(12) United States Patent
Choi et al.

(10) Patent No.: US 11,503,365 B2
(45) Date of Patent: Nov. 15, 2022

(54) ELECTRONIC APPARATUS AND CONTROL METHOD THEREOF

(71) Applicant: SAMSUNG ELECTRONICS CO., LTD., Suwon-si (KR)

(72) Inventors: Hyunsoo Choi, Suwon-si (KR); Younguk Kim, Suwon-si (KR); Hyunhan Kim, Suwon (KR); Hyosang Kim, Suwon-si (KR); Sungjin Kim, Suwon-si (KR); Jaewoo Lee, Suwon-si (KR); Jongmyoung Joh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 17/033,057

(22) Filed: Sep. 25, 2020

(65) Prior Publication Data

US 2021/0127158 A1     Apr. 29, 2021

(30) Foreign Application Priority Data

Oct. 29, 2019     (KR) ........................ 10-2019-0135815

(51) Int. Cl.
| | | |
|---|---|---|
| *H04N 21/44* | (2011.01) | |
| *G06F 16/51* | (2019.01) | |
| *G06V 40/12* | (2022.01) | |
| *H04N 21/6547* | (2011.01) | |
| *G06F 16/23* | (2019.01) | |

(Continued)

(52) U.S. Cl.
CPC ....... *H04N 21/44008* (2013.01); *G06F 16/51* (2019.01); *G06V 40/1365* (2022.01); *H04N 21/6547* (2013.01)

(58) Field of Classification Search
CPC ......... H04N 21/44008; H04N 21/6547; H04N 21/44016; H04N 21/4586; H04N 21/6543;

(Continued)

(56) References Cited

U.S. PATENT DOCUMENTS 9,460,204 B2 * 10/2016 Larsen ................. H04H 60/375
9,704,016 B2 *  7/2017 Jang ................... H04N 21/4758

(Continued)

FOREIGN PATENT DOCUMENTS

| KR | 10-2016-0053549 A | 5/2016 |
|---|---|---|
| KR | 10-2018-0037826 A | 4/2018 |
| KR | 10-1981924 B1 | 8/2019 |

OTHER PUBLICATIONS

International Search Report (PCT/ISA/210) dated Jan. 15, 2021 issued by the International Searching Authority in International Application No. PCT/KR2020/013619.

(Continued)

*Primary Examiner* — Asghar H Bilgrami
(74) *Attorney, Agent, or Firm* — Sughrue Mion, PLLC

(57) ABSTRACT

An electronic apparatus and a method of controlling the same are provided. The electronic apparatus includes a communication interface and a processor configured to receive multimedia data from an external apparatus, obtain a first finger print of first frames among a plurality of frames included in the multimedia data, the first frames being included in a first time interval, and transmit the first finger print to the server; identify whether a content in the multimedia data has been changed and a time point indicating a time of identifying a change in the content; based on identifying that the content has been changed, obtain a second finger print of a frame corresponding to the time point, and transmit the second finger print to the server; receive content information corresponding to the second finger print, and determine whether to change the first time interval based on the content information.

20 Claims, 9 Drawing Sheets

(51) Int. Cl.

| | | |
|---|---|---|
| *G06F 16/2458* | (2019.01) | |
| *H04N 21/458* | (2011.01) | |
| *H04N 21/6543* | (2011.01) | |
| *H04N 21/658* | (2011.01) | |
| *H04N 21/81* | (2011.01) | |
| *H04N 21/435* | (2011.01) | |
| *H04N 21/845* | (2011.01) | |

(58) Field of Classification Search
CPC ........... H04N 21/6582; H04N 21/4353; H04N 21/8455; H04N 21/8456; G06F 16/51; G06F 16/2358; G06F 16/2477; G06V 40/1365

See application file for complete search history.

(56) References Cited

U.S. PATENT DOCUMENTS

| | | | | |
|---|---|---|---|---|
| 9,888,268 | B2* | 2/2018 | An | ................... H04N 21/47214 |
| 10,142,679 | B2* | 11/2018 | Koh | .................... H04N 21/251 |
| 10,219,011 | B2 | 2/2019 | Jung et al. | |
| 10,750,236 | B2* | 8/2020 | Chen | ................. H04N 21/44008 |
| 10,939,185 | B2* | 3/2021 | Harron | .................... H04N 21/84 |
| 2012/0324499 | A1* | 12/2012 | Deng | ................ H04N 21/44222 |
| | | | | 725/18 |
| 2014/0337874 | A1 | 11/2014 | Kitazato | |
| 2016/0112733 | A1* | 4/2016 | Kim | ...................... G06F 3/0482 |
| | | | | 725/109 |
| 2016/0316262 | A1* | 10/2016 | Chen | ..................... G06F 16/435 |
| 2017/0272836 | A1 | 9/2017 | Chen | |
| 2017/0295400 | A1 | 10/2017 | Jang et al. | |
| 2018/0176633 | A1* | 6/2018 | Yeo | ................. H04N 21/44008 |
| 2020/0029115 | A1* | 1/2020 | Dunker | ................ H04N 21/242 |

OTHER PUBLICATIONS

Written Opinion (PCT/ISA/237) dated Jan. 15, 2021 issued by the International Searching Authority in International Application No. PCT/KR2020/013619.

* cited by examiner

ELECTRONIC APPARATUS AND CONTROL METHOD THEREOF

CROSS-REFERENCE TO RELATED APPLICATION(S)

This application is based on and claims priority under 35 U.S.C. § 119(a) to Korean Patent Application No. 10-2019-0135815, filed on Oct. 29, 2019 in the Korean Intellectual Property Office, the disclosure of which is incorporated by reference herein in its entirety.

BACKGROUND

1. Field

The disclosure relates to an electronic apparatus and a control method thereof, and more particularly, to an electronic apparatus which identifies contents included in multimedia data, and a control method thereof.

2. Description of Related Art

For automatic contents recognition (ACR) for recognition of TV contents, it is necessary that program identification information and contents associated with the program identification information such as titles, genres, cast members, etc. are constructed in a database. In particular, for contents recognition based on a finger print, finger print data of a content to be recognized is extracted in advance, and the finger print data is mapped to the associated information of the content and stored in a server. When the finger print data of the current screen is extracted from a TV and transmitted to the server, the server identifies whether there is a matching finger print, and provides the program title and associated information for the matching finger print to the TV.

In a related contents recognition system, finger prints are searched periodically even though there is no change in contents, and thus the cost for maintaining the server increases. That is, there is a problem that the cost for maintaining the server increases due to unnecessary matching attempts.

In addition, as a TV also transmits finger print data periodically, there is a problem of delays occurring due to unnecessary information congesting the bandwidth of a network.

SUMMARY

In accordance with an aspect of the disclosure, there is provided an electronic apparatus including: a communication interface configured to communicate with an external apparatus and a server; and a processor configured to: receive multimedia data from the external apparatus through the communication interface, obtain a first finger print of first frames among a plurality of frames included in the multimedia data, the first frames being included in a first time interval, and control the communication interface to transmit the first finger print to the server, identify whether a content in the multimedia data has been changed and a time point indicating a time of identifying a change in the content, based on identifying that the content in the multimedia data has been changed, obtain a second finger print of a frame corresponding to the time point, and control the communication interface to transmit the second finger print to the server, receive, from the server, content information corresponding to the second finger print through the communication interface, and determine whether to change the first time interval based on the content information.

The processor is further configured to, based on the content information received from the server being first content information, obtain a third finger print of second frames among the plurality of frames in a second time interval, the second time interval being greater than the first time interval after the time point and control the communication interface to transmit the third finger print to the server.

The processor is further configured to control the communication interface to transmit the third finger print and first search subject information of the third finger print to the server, and wherein the first search subject information is information indicating that search subjects are a plurality of databases corresponding to different content types.

The processor is further configured to, based on the content information received from the server being the first content information corresponding to the second finger print, obtain a fourth finger print of at least one frame among the second frames in the second time interval, control the communication interface to transmit the fourth finger print and second search subject information of the fourth finger print to the server, and wherein the second search subject information is information indicating that the search subjects are some of the plurality of databases.

The processor is further configured to receive information on an ending point of the changed content from the server through the communication interface, and identify that the content has been changed based on the information on the ending point.

The first search subject information includes information indicating that the search subjects are at least one of a live content database, a commercial content database, a digital video recorder (DVR) content database, or a video on demand (VOD) content database, and the second search subject information includes information indicating that one of the search subjects is the commercial content database.

The first content information includes information indicating that a type of the content is a live content and information indicating that a number of channels providing the content is one.

The processor is further configured to, based on at least one of an on screen display (OSD), a mute, or a predetermined screen being identified from the multimedia data, identify that the content corresponding to the multimedia data has been changed.

The processor is further configured to, based on the content information received from the server being second content information, maintain the first time interval of obtaining the first finger print.

The second content information includes information indicating that a type of the content is a content excluding a live content or information indicating that there are a plurality of channels providing the content.

In accordance with an aspect of the disclosure, there is provided a control method of an electronic apparatus, the method including: receiving multimedia data from an external apparatus; obtaining a first finger print of first frames among a plurality of frames included in the multimedia data, the first frames being included in a first time interval, and transmitting the first finger print to a server; identifying whether a content in the multimedia data has been changed and a time point indicating a time of identifying a change in the content; based on identifying that the content in the multimedia data has been changed, obtaining a second finger print of a frame corresponding to the time point, and transmitting the second finger print to the server; receiving, from the server, content information corresponding to the second finger print; and determining whether to change the first time interval based on the content information.

The determining further includes, based on the content information received from the server being first content information, obtaining a third finger print of second frames among the plurality of frames in a second time interval, the second time interval being greater than the first time interval after the time point and transmitting the third finger print to the server.

The determining further includes: transmitting the third finger print and first search subject information of the third finger print to the server, and wherein the first search subject information is information indicating that search subjects are a plurality of databases corresponding to different content types.

The determining further includes: based on the content information received from the server being the first content information corresponding to the second finger print, obtaining a fourth finger print of at least one frame among the second frames in the second time interval; and transmitting the fourth finger print and second search subject information of the fourth finger print to the server, and wherein the second search subject information is information indicating that the search subjects are some of the plurality of databases.

The determining further includes receiving information on an ending point of the changed content from the server, and the identifying whether the content in the multimedia data has been changed further includes identifying that the content has been changed based on the information on the ending point.

The first search subject information includes information indicating that the search subjects are at least one of a live content database, a commercial content database, a digital video recorder (DVR) content database, or a video on demand (VOD) content database, and the second search subject information includes information indicating that one of the search subjects is the commercial content database.

The first content information includes information indicating that a type of the content is a live content and information indicating that a number of channels providing the content is one.

The transmitting the second finger print to the server further includes, based on at least one of an on screen display (OSD), a mute, or a predetermined screen being identified from the multimedia data, identifying that the content corresponding to the multimedia data has been changed.

The determining further includes, based on the content information received from the server being second content information, maintaining the first time interval of obtaining the first finger print.

The second content information includes information indicating that a type of the content is a content excluding a live content or information indicating that there are a plurality of channels providing the content.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
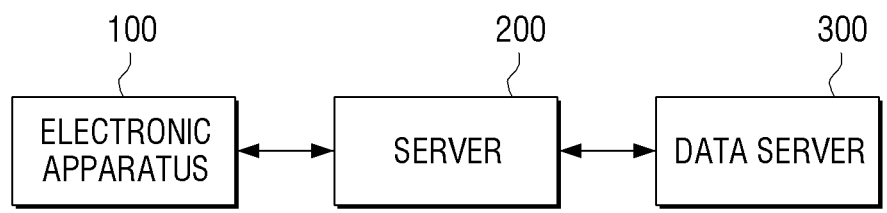
FIG. 1 is a block diagram illustrating an example of a configuration of an electronic system according to an embodiment.

Exemplary embodiments of the disclosure may be diversely modified. Accordingly, specific embodiments are illustrated in the drawings and are described in detail in the description herein. However, it is to be understood that the present disclosure is not limited to a specific embodiment, but may include all modifications, equivalents, and substitutions without departing from the scope and spirit of the present disclosure. Also, well-known functions or constructions are not described in detail because they may obscure the disclosure with unnecessary detail.

Hereinafter, embodiments of the disclosure will be described in detail with reference to the accompanying drawings.

FIG. 1 is a block diagram illustrating an example of a configuration of an electronic system 1000. According to FIG. 1, the electronic system 1000 includes an electronic apparatus 100, a server 200, and a data server 300.

The electronic apparatus 100 is an apparatus may receive multimedia data from an external apparatus, and it may be an apparatus such as a TV, a desktop PC, a laptop computer, a smartphone, a tablet PC, smart glasses, a smart watch, etc. However, this is merely an example, and the electronic apparatus 100 may be any apparatus that receives multimedia data from an external apparatus. Here, an external apparatus may be an external content server, a broadcasting station server, a satellite cable server, etc. Also, an external apparatus may be a universal serial bus (USB) device, a compact disc (CD), a game machine, a set top box (STB), etc., and it may be any apparatus that can provide multimedia data to the electronic apparatus 100. In addition, multimedia data may include at least one of video data or audio data.

The electronic apparatus 100 may acquire a finger print included in multimedia data, and transmit the acquired finger print to the server 200. Here, a finger print is identification information that can distinguish one frame from another frame, and it means intrinsic data of each frame. Specifically, a finger print is feature data extracted from a video, an image, or an audio signal included in a frame, and unlike metadata based on texts, it reflects the feature of a signal or frame itself. Accordingly, a finger print is also referred to as finger print data, DNA data, or genetic data.

For example, in the case of an image or a video signal, a finger print may be data expressing features such as a motion vector, a color, etc.

A finger print may be extracted by various algorithms. As an example, an audio signal may be divided into specific time intervals, and the frequencies of the signals included in each time interval are calculated. Then, the frequency tilt is calculated by obtaining the difference between signals in adjacent frequency sections, and in case the tilt is a positive number, it may be quantized as 1, and in case the tilt is a negative number, it may be quantized as 0. Accordingly, finger print data may be generated based on the frequency tilt. However, this is merely an example, and a finger print may be acquired by various other methods.

The electronic apparatus 100 may receive content information corresponding to the acquired finger print from the server 200. For example, the electronic apparatus 100 may receive content information such as the title of a content corresponding to the finger print, the starting time and the ending time of broadcasting, the cast members, the channel number, the type of the content, etc. from the server 200.

The electronic apparatus 100 may transmit search subject information as well as a finger print to the server 200. The search subject information may include information designating a range of search corresponding to the finger print. A range of search will be described in detail with the data server 300 herein below.

The server 200 may receive a finger print from the electronic apparatus 100, and transmit the received finger print to the data server 300. When content information for a content corresponding to the finger print is received from the data server 300, the server 200 may provide the received content information to the electronic apparatus 100.

When search subject information is received from the electronic apparatus 100, the server 200 may identify a search range of the finger print received together with the search subject information. For example, in case the data server 300 includes a plurality of databases, the server 200 may control the data server 300 to search a database corresponding to search subject information among the plurality of databases. Furthermore, the server 200 may provide search subject information to the data server 300, and the data server 300 may search only a database corresponding to the search subject information among the plurality of databases.

In addition, in case the data server 300 includes a plurality of database servers that are distinguishable from each other, the server 200 may transmit the finger print to the database server corresponding to the search subject information among the plurality of database servers. Through a method as above, the load of the data server 300 may be reduced.

The data server 300 may store a plurality of finger prints. For example, the data server 300 may store a plurality of finger prints for each of a plurality of contents.

Also, the data server 300 may store finger prints by distinguishing finger prints for each type of contents. For example, the data server 300 may store at least one of finger prints of live contents, finger prints of commercial contents, finger prints of digital video recorder (DVR) contents, or finger prints of video on demand (VOD) contents.

Alternatively, the data server 300 may include a plurality of database servers that may be different from each other. For example, the data server 300 may include at least one of a live content database server storing finger prints of live contents, a commercial content database server storing finger prints of commercial contents, a DVR content database server storing finger prints of DVR contents, or a VOD content database server storing finger prints of VOD contents.

In case the data server 300 stores a plurality of databases, the data server 300 may perform search for finger prints in some of the plurality of databases according to a control of the server 200. Also, the data server 300 may perform search for finger prints in some databases according to search subject information received from the server 200.

Alternatively, in case the data server 300 includes a plurality of database servers distinguished for each of a plurality of databases, only a database server that received a finger print from the server 200 among the plurality of database servers may perform search for the finger print.

The data server 300 may identify a finger print that corresponds to the finger print received from the server 200 among a plurality of prestored finger prints, and transmit content information for a content corresponding to the identified finger print to the server 200. For example, the data server 300 may transmit content information regarding the title of the content corresponding to the identified finger print, the starting time and the ending time of broadcasting, the cast members, the channel number, the type of the content, etc. to the server 200.

Based on the embodiments described above, the electronic apparatus 100 may identify a content corresponding to the multimedia content currently received. Hereinafter, an operation of the electronic apparatus 100 for reducing the load of the data server 300 will be described in more detail.

Figure 2:
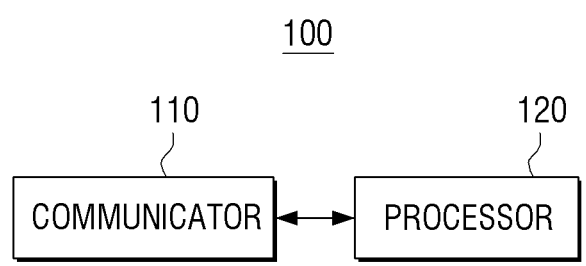
FIG. 2 is a block diagram illustrating an example of a configuration of an electronic apparatus according to an embodiment.

FIG. 2 is a block diagram illustrating an example of a configuration of the electronic apparatus 100. According to FIG. 2, the electronic apparatus 100 includes a communicator 110 and a processor 120.

The communicator 110 is a component for performing communication with various apparatuses. For example, the communicator 110 may support various communication methods such as BlueTooth (BT), Bluetooth Low Energy (BLE), Wireless Fidelity (WI-FI), Zigbee, etc. However, embodiments are not limited thereto, and any communication protocol that can enable wireless communication can be used.

Also, the communicator 110 may include a communication interface that can perform wired communication with various apparatuses. For example, the communicator 110 may include a communication interface such as a High-Definition Multimedia Interface (HDMI), a Mobile High-Definition Link (MHL), a USB, a Red Green Blue (RGB) cable, a D-subminiature (D-SUB), a Digital Visual Interface (DVI), etc., and may perform communication with various servers.

The electronic apparatus 100 may be connected with an external apparatus and receive multimedia data. The electronic apparatus 100 may be connected with an external apparatus through a communication interface such as an HDMI, a Display Port (DP), a thunderbolt, a USB, an RGB, a D-SUB, a DVI, etc., and the communicator 110 may include all wired communication interfaces. Also, a wired communication interface may include not only a protocol performing a video input and an audio input through one port, but also a protocol performing a video input and an audio input through two ports.

However, the embodiment is not limited thereto, and any wired communication interface having a protocol that can perform at least one of a video input or an audio input can be used.

The communicator 110 may include interfaces of all communication protocols that can perform wired communication with various apparatuses in addition to the wired communication interfaces described above.

The processor 120 controls the overall operations of the electronic apparatus 100.

According to an embodiment of the disclosure, the processor 120 may be implemented as a digital signal processor (DSP), a microprocessor, and a time controller (TCON). However, the embodiment is not limited thereto, and the processor 120 may include one or more of a central processing unit (CPU), a micro controller unit (MCU), a micro processing unit (MPU), a controller, an application processor (AP) or a communication processor (CP), and an advanced RISC machine (ARM) processor, or may be defined by the terms. Also, the processor 120 may be implemented as a System on Chip (SoC) having a processing algorithm stored therein or large scale integration (LSI), or in the form of a field programmable gate array (FPGA).

The processor 120 may receive multimedia data from an external apparatus through the communicator 110. Here, an external apparatus may be an apparatus that provides multimedia data corresponding to a content to the electronic apparatus 100 such as a set top box. That is, an external apparatus performs image processing on a content and provides multimedia data to the electronic apparatus 100, and the electronic apparatus 100 may provide the received multimedia data to a display apparatus without separate image processing or directly display the multimedia data.

The processor 120 may acquire a first finger print for a first frame, in a first time interval, among a plurality of frames included in multimedia data, and control the communicator 110 to transmit the first finger print to the server 200. For example, the processor 120 may acquire the first finger print of the first frame in an interval of 60 seconds, and control the communicator 110 to transmit the acquired first finger print to the server 200. Accordingly, the electronic apparatus 100 may receive content information from the server 200 at an interval of approximately 60 seconds corresponding to the first finger print.

If it is identified that a content corresponding to multimedia data has been changed, the processor 120 may acquire a second finger print of a frame corresponding to the time point of identification, and control the communicator 110 to transmit the second finger print to the server 200. Here, an operation of identifying a change in a content may be irrelevant to an actual change of a content. That is, the processor 120 may identify a time point where it is highly likely that a content is changed, and the identification of actual change of the content is performed in case content information received from the server 200 is different from the information previously received.

Also, a frame corresponding to the time point of the identification may not only mean the frame of the time point of identification but also a plurality of frames in a predetermined number after the time point of identification. For example, if it is identified that a content corresponding to multimedia data has been changed at 12 o'clock, the processor 120 may acquire the second finger print of the frame of 12 o'clock, or acquire the second finger prints of three frames after 12 o'clock. In the case of the latter, the processor 120 acquires three second finger prints and transmits the three second finger prints to the server 200. The server 200 may identify the changed content information from content information for each of the three second finger prints, and provide only the changed content information among the three second finger prints to the electronic apparatus 100. Alternatively, the processor 120 may transmit the three second finger prints to the server 200, and receive all content information for the three second finger prints from the server 200. In this case, the processor 120 may identify changed content information from the received information.

According to the embodiments described above, a time point when the processor 120 transmits a finger print may be changed. For example, the processor 120 may acquire a first finger print per frame of an interval of 60 seconds in a plurality of frames included in multimedia data, and transmit the acquired first finger print to the server 200. For example, the processor 120 transmits the first finger print to the server 200 at 12:01, transmits the second first finger print to the server 200 at 12:02, and transmits the third first finger print to the server 200 at 12:03. Here, if it is identified that the content has been changed at 12:03:30, the processor 120 may transmit the first finger print to the server 200 at 12:03:30, and transmit the second finger print to the server 200 at 12:04:30, and transmit the third second finger print to the server 200 at 12:05:30. That is, if a content is changed, a phase of transmitting a finger print may be also changed.

The processor 120 may determine whether to change the first time interval based on content information received from the server 200 through the communicator 110 corresponding to the second finger print.

Specifically, if content information received from the server 200 is first content information, the processor 120 may acquire a third finger print of a frame, in a second time interval that is greater than the first time interval, among the plurality of frames included in the multimedia data, after the time point of the identification and control the communicator 110 to transmit the third finger print to the server 200. For example, in a situation where the processor 120 acquires the first finger print per frame in an interval of 60 seconds, and transmits the acquired first finger print to the server 200, as the processor 120 identifies change of the content, the processor 120 may transmit the second finger print to the server 200, and if content information received from the server 200 is first content information, the processor 120 may acquire a third finger print of a frame in an interval of 300 seconds that is greater than the interval of 60 seconds in the plurality of frames included in the multimedia data after the time point of the identification and control the communicator 110 to transmit the third finger print to the server 200. Through the operation described above, a search time for the data server 300 may be reduced, and thus load can be reduced.

Also, the processor 120 may quickly identify whether a content has been changed based on content information received from the server 200. For example, in the case of transmitting a finger print by a predetermined cycle as in the past, change of a content could not be identified until the cycle returns, but the processor 120 transmits a finger print to the server 200 whenever it is identified that the content has been changed, and thus the change of a content can be identified more quickly than in the past.

The processor 120 may control the communicator 110 to transmit the third finger print and the first search subject information of the third finger print to the server 200. Here, the first search subject information may be information indicating that the search subjects are a plurality of databases corresponding to different content types. For example, the first search subject information may include information indicating that the search subjects are a live content database, a commercial content database, a digital video recorder (DVR) content database, and a video on demand (VOD) content database. That is, in case the processor 120 transmits the third finger print and the first search subject information of the third finger print to the server 200, search may be performed in all databases of the data server 300.

Furthermore, if the content information corresponding to the second finger print is the first content information, the processor 120 may acquire a fourth finger print in at least one frame among the frames in the second time interval, and control the communicator 110 to transmit the fourth finger print and the second search subject information of the fourth finger print to the server 200. That is, in a case where the content information corresponding to the second finger print is the first content information, the processor 120 may further acquire the fourth finger print between time points of acquiring the third finger prints in addition to the third finger print. According to the aforementioned example, the time cycle of acquiring the fourth finger print may be shorter than 300 seconds. Here, the second search subject information may be information indicating that the search subjects are some of the plurality of databases. For example, the second search subject information may include information indicating that the search subject is the commercial content database. That is, in case the processor 120 transmits the fourth finger print and the second search subject information of the fourth finger print to the server 200, a search may be performed in only with respect to some databases of the data server 300. In such case, the search may be performed in only some databases of the data server 300, and thus the load of the data server 300 can be reduced.

The embodiments described above are for identifying that a commercial content is provided while a user views a live content, and the processor 120 may identify a commercial content through the fourth finger print, and when the live content is provided again, the processor 120 may identify the live content with the third finger print.

The processor 120 may receive information on the ending point of the changed content from the server 200 through the communicator 110, and identify that the content has been changed to another content based on the information on the ending point. For example, in case a user views a live channel, even if the content is changed, the processor 120 may not detect that the content has been changed. In this case, the processor 120 may identify that the content has been changed based on the information on the ending point of the content received from the server 200, and acquire a finger print from a frame, and transmit the finger print to the server 200. The processor 120 may identify change of the content based on the content information received from the server 200.

Here, the first content information may include information indicating that the type of a content corresponding to a finger print is a live content and information indicating that the channel providing the content corresponding to the finger print is one. That is, in case the content information received from the server 200 includes information indicating that the type of the content is a live content and the channel providing the content corresponding to the finger print is one, the processor 120 may change the cycle of acquiring a finger print, and change the search subjects of some finger prints.

Alternatively, if the content information received from the server 200 is the second content information, the processor 120 may maintain the first time interval of acquiring the first finger print. Here, the second content information may include information indicating that the type of a content corresponding to a finger print is a content excluding a live content or information indicating that there are a plurality of channels providing a content corresponding to a finger print. Also, if the content information received from the server 200 is the second content information, the processor 120 may not change the search subject information.

For example, in case the content information received from the server 200 includes information indicating that the type of a content corresponding to a finger print is a content excluding a live content, there is no need to identify a commercial content, and thus the processor 120 does not change the time interval of acquiring a finger print. Alternatively, in case the content information received from the server 200 includes information indicating that there are a plurality of channels providing a content corresponding to a finger print, it may be difficult to specify channels providing the content, and thus the processor 120 does not change the time interval of acquiring a finger print.

Furthermore, if at least one of an on screen display (OSD), a mute, or a predetermined screen (e.g., a black screen) is identified from multimedia data, the processor 120 may identify that the content corresponding to the multimedia data has been changed. For example, the processor 120 may identify the degree of similarity between a prestored OSD template and the current frame, and if it is identified that the current frame is similar to the prestored OSD template, the processor 120 may identify that the content has been changed.

However, the embodiments are not limited thereto, and the processor 120 may identify a change of content by various other methods. By using the method described above, the processor 120 may identify a change of content even if the content is changed without a user manipulation.

Accordingly, the electronic apparatus 100 may reduce the load of the data server 300, and therefore, the cost for managing the server can be saved. Hereinafter, operations of the electronic apparatus 100 will be described in more detail with reference to the drawings.

Figure 3:
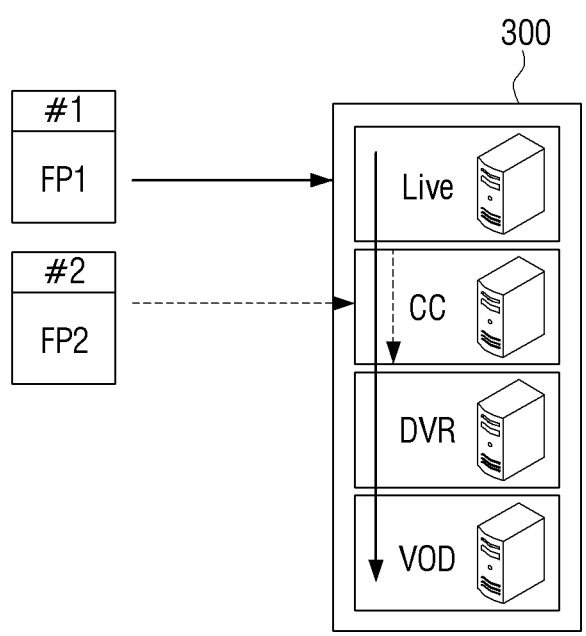
FIG. 3 is a diagram illustrating operations according to the types of data transmitted from an electronic apparatus according to an embodiment.

FIG. 3 is a diagram illustrating operations according to the types of data transmitted from the electronic apparatus 100 according to an embodiment.

As illustrated in FIG. 3, in case the processor 120 transmits the finger print 1 (FP1) and the finger print 2 (FP2) to the server 200, search subject information may be added by a method such as #1 or #2. For example, search subject information may be added to a finger print in a form of header information.

The size of added data may vary according to the type of the search subject. For example, if a search is divided into a first method of searching the entire databases and a second method of searching only the commercial content database (CC) as illustrated in FIG. 3, the added data may be expressed in one bit. Alternatively, in case a search is divided into a first method of searching the entire databases, a second method of searching only live contents, a third method of searching only VOD contents, and a fourth method of searching only the commercial content database (CC), the added data may be expressed in two bits. In other words, depending on the number of search schemes used to search the data server as described above, the size of the added data may vary.

The subject identifying the added data may be the server 200, or the data server 300. For example, the server 200 may provide data received from the electronic apparatus 100 to the data server 300, and the data server 300 may identify the added data and determine a search subject. Alternatively, the server 200 may identify the added data from data received from the electronic apparatus 100 and search a database which is the search subject at the data server 300.

The processor 120 may generate a query by a method as in FIG. 3 and transmit the query to the server 200.

In FIG. 3, four types of databases or four types of database servers are illustrated, but the disclosure is not limited thereto, and databases may constructed differently depending on the user's need.

FIG. 4 to FIG. 7 are diagrams illustrating operations of the electronic apparatus 100 according to the various embodiments. In FIG. 4 to FIG. 7, the upper drawings illustrate conventional technologies, and the lower drawings illustrate the operations according to the disclosure. Also, in FIG. 4 to FIG. 7, arrows in bold illustrate time points when it is identified that contents have been changed, arrows in continuous lines in small sizes indicate search of the entire databases, and arrows in dotted lines in small sizes indicate search of some of the databases.

Figure 4:
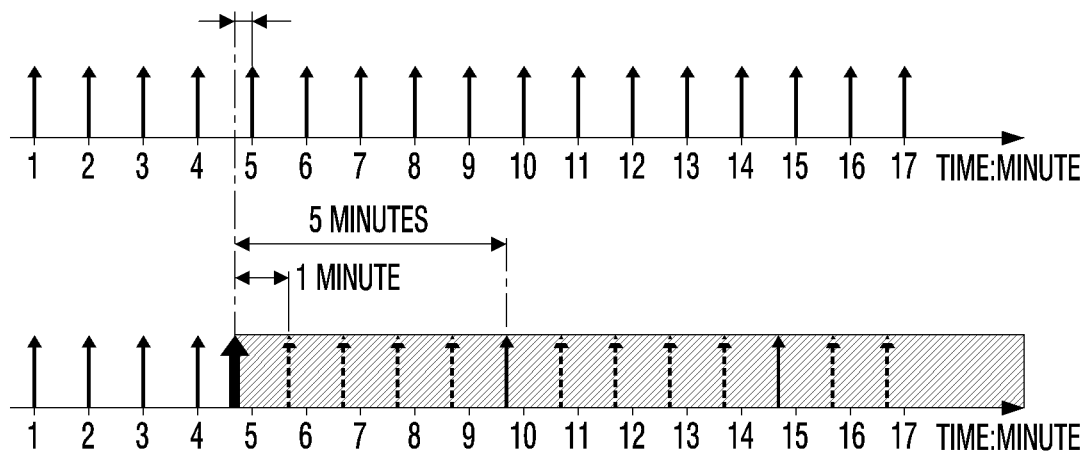
FIG. 4 is a diagram illustrating operations of an electronic apparatus according to an embodiment.

First, as illustrated in the lower part of FIG. 4, if it is identified that the content has been changed, the processor 120 may generate a query such that search of finger prints acquired at an interval of five minutes is performed in the entire databases, and transmit the generated query to the server 200. Also, after it is identified that the content has been changed, the processor 120 may generate a query such that search of finger prints acquired at an interval of one minute is performed in some of the databases, and transmit the generated query to the server 200. Here, as illustrated in FIG. 3, if the time point of an interval of five minutes comes while acquiring finger prints at an interval of one minute, the processor 120 may generate a query such that search of the finger prints at the time point is performed in the entire databases, and transmit the generated query to the server 200. That is, the processor 120 may additionally acquire finger prints at an interval of one minute in the middle of the time of acquiring finger prints at an interval of five minutes.

As the finger prints acquired at an interval of one minute are searched in some of the databases, the load of the data server 300 is reduced.

In addition, in the lower part of FIG. 4, the time point of acquiring a finger print is adjusted based on the time point of change of the content, and thus the time point of acquiring a finger print may be different from the upper part of FIG. 4.

Figure 5:
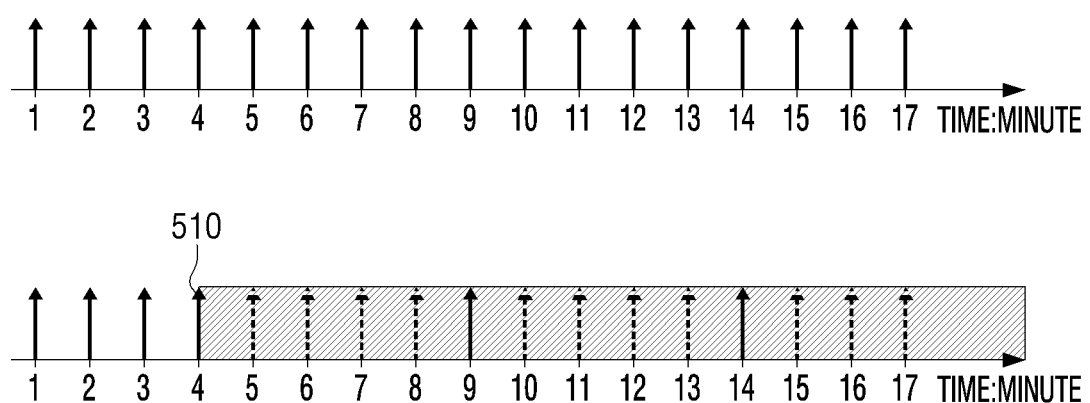
FIG. 5 is a diagram illustrating operations of an electronic apparatus according to an embodiment.

The lower part of FIG. 5 illustrates a case in which the content information includes information that the current content is a live content and information that the current content is provided on a plurality of channels.

As illustrated in the lower part of FIG. 5, the processor 120 generates a query by a regular cycle and transmits the query to the server 200. The time point before the arrow 510 is a state where the received content information includes information that the current content is a live content and information that the current content is provided on a plurality of channels.

Afterwards, if the content information received at the time point of the arrow 510 includes information that the current content is a live content and information that the current content is provided on a single channel, the processor 120 operates in the same way as in the time period after the time point of change of the content in the lower part of FIG. 4. That is, even if there is no change of the channel, the processor 120 may operate as in the lower part of FIG. 4. Accordingly, in the upper part and the lower part of FIG. 5, the time point of acquiring a finger print may be maintained to be the same.

Figure 6:
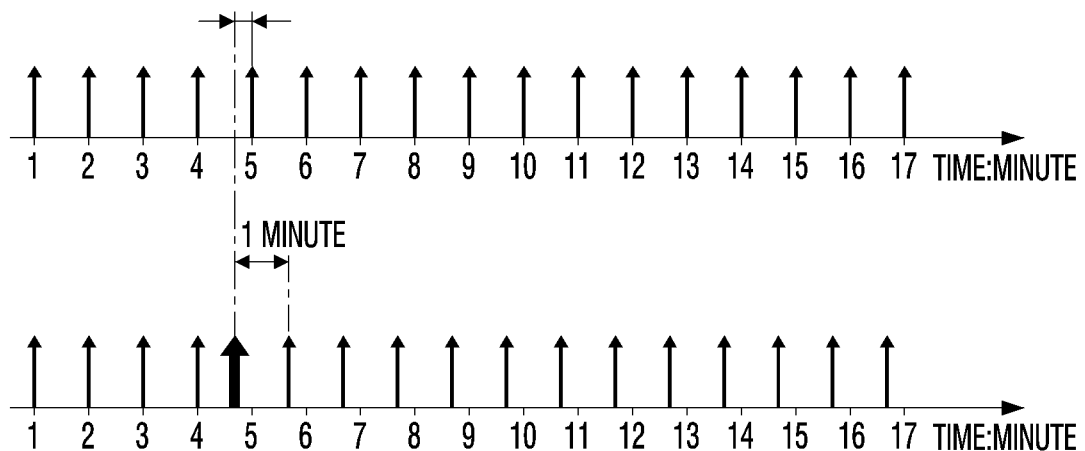
FIG. 6 is a diagram illustrating operations of an electronic apparatus according to an embodiment.

The lower part of FIG. 6 is a case in which it is identified that the content has been changed, but the content information received from the server 200 includes information indicating that the type of a content corresponding to a finger print is a content excluding a live content or information indicating that there are a plurality of channels providing a content corresponding to a finger print.

In this case, the processor 120 does not change the time cycle of acquiring a finger print, or the range of search subjects of a finger print. Meanwhile, in the lower part of FIG. 6, the time point of acquiring a finger print is adjusted based on the time point of change of the content, and thus there may be a difference from the upper part of FIG. 6 in the time point of acquiring a finger print.

Figure 7:
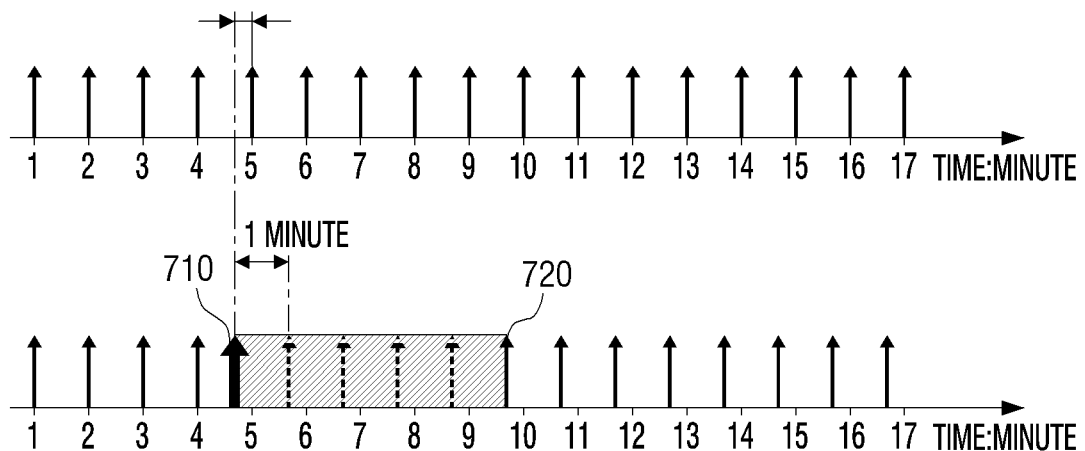
FIG. 7 is a diagram illustrating operations of an electronic apparatus according to an embodiment.

The lower part of FIG. 7 illustrates a state in which the change of the content has been identified in the lower part of FIG. 4, and the content information received from the server 200 includes the first content information that has been changed to a case where the content information includes the second content information.

As the operation after the arrow 710 is the same as the lower part of FIG. 4, overlapping explanation will be omitted, and the operation after the arrow 720 will be explained. The arrow 720 illustrates a query generated such that search of finger prints acquired at an interval of five minutes is performed in the entire databases, and illustrates a case wherein, the content information received from the server 200 afterwards includes information indicating that the type of a content corresponding to a finger print is a content excluding a live content or information indicating that there are a plurality of channels providing a content corresponding to a finger print. Accordingly, the processor 120 may reduce the cycle of acquiring a finger print for which search is performed in the entire databases from five minutes to one minute again. Accordingly, search of the finger prints acquired afterwards is not performed in some of the databases.

Figure 8:
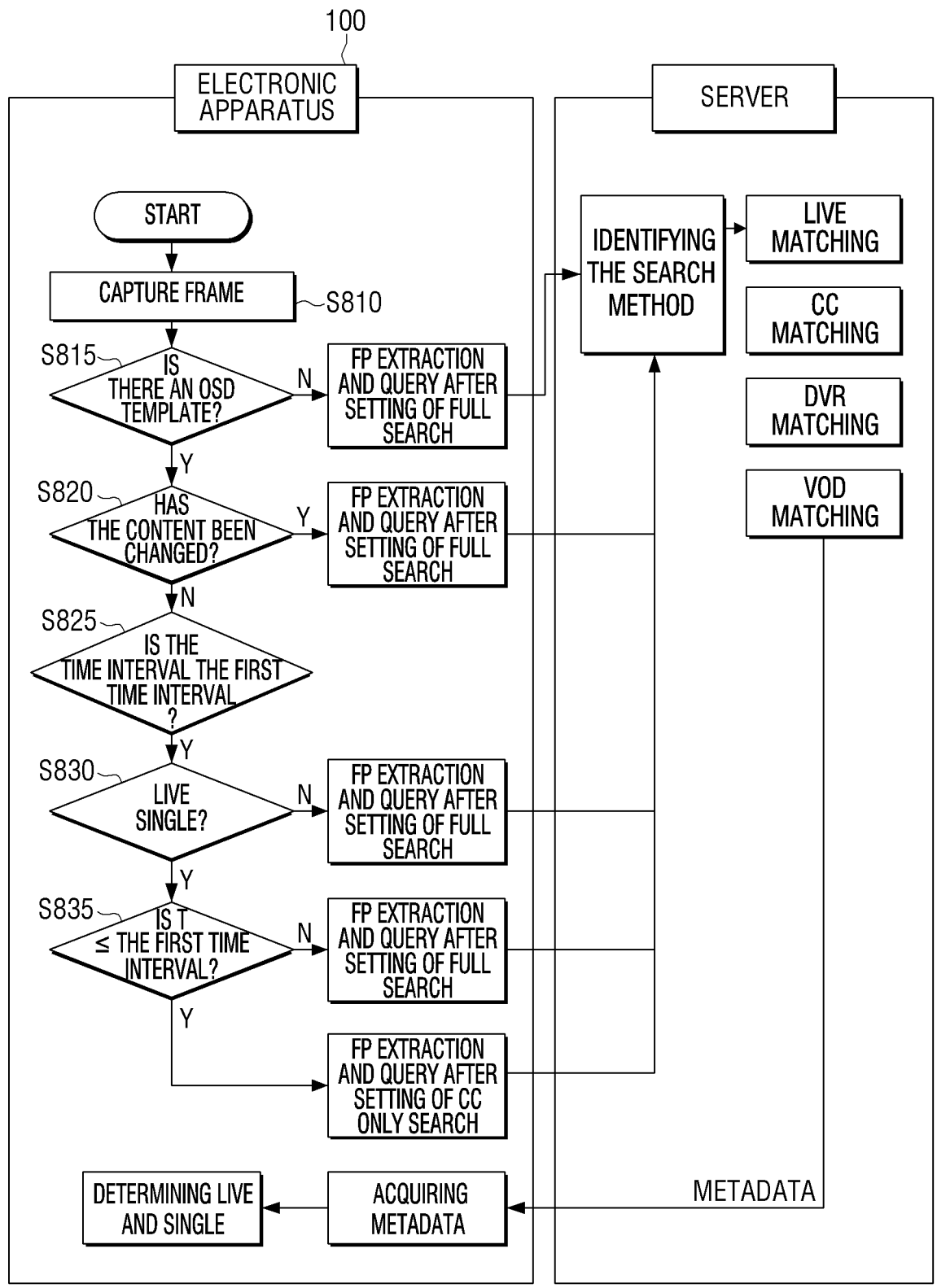
FIG. 8 is a flowchart illustrating an interaction between an electronic apparatus and a server according to an embodiment.

FIG. 8 is a flowchart illustrating an interaction between an electronic apparatus and a server according to an embodiment. Here, for the convenience of explanation, it is assumed that the number of the server 200 and the number of the data server 300 in FIG. 1 are only one, respectively.

First, the processor 120 may capture a frame at operation S810, and identify whether an OSD template is stored in advance at operation S815. In case an OSD template is not stored, the processor 120 may acquire a finger print according to one of the embodiments described above, and transmit the acquired finger print to the server. Here, the server performs search in the entire databases. That is, the processor 120 may acquire a finger print, and transmit a query to the server after setting a full search.

Alternatively, in case an OSD template is stored in advance, the processor 120 may identify whether the content has been changed at operation S820. If it is identified that the content has been changed, the processor 120 may acquire a finger print, and transmit the finger print and the first search subject information to the server. That is, the processor 120 may acquire a finger print, and transmit a query to the server after setting a full search.

If it is identified that the content has not been changed, the processor 120 may identify whether the time interval is within the first time interval at operation S825. If the time interval is within the first time interval, the processor 120 may identify whether the content is a live content and is provided on a single channel at operation S830. Such an operation may be performed based on metadata acquired from the server.

In case the content is not a live content, or is not provided on a single channel, the processor 120 may acquire a finger print, and transmit the finger print and the first search subject information to the server. That is, the processor 120 may acquire a finger print, and transmit a query to the server after setting of a full search.

In case the content is a live content, and is provided on a single channel, the processor 120 may identify whether T is within the first time interval at operation S835. Here, T indicates the difference between the current query time and the query time of finger prints for which search is performed in the entire databases.

If T is less than or equal to the first time interval, the processor 120 may acquire a finger print, and transmit the finger print and the first search subject information to the server. That is, the processor 120 may acquire a finger print, and transmit a query to the server after setting of a full search.

Alternatively, if T is greater than the first time interval, the processor 120 may acquire a finger print, and transmit the finger print and the second search subject information to the server. That is, the processor 120 may acquire a finger print, and transmit a query to the server after setting of a CC only search.

The server may perform search in the entire databases or perform search in some of the databases based on the finger print and the search subject information received from the electronic apparatus 100. Then, the server may provide the search result to the electronic apparatus 100 as metadata.

In particular, the server may perform search in some of the databases, and thus the load is reduced.

The electronic apparatus 100 may identify whether a content is a live content based on metadata received from the server.

Figure 9:
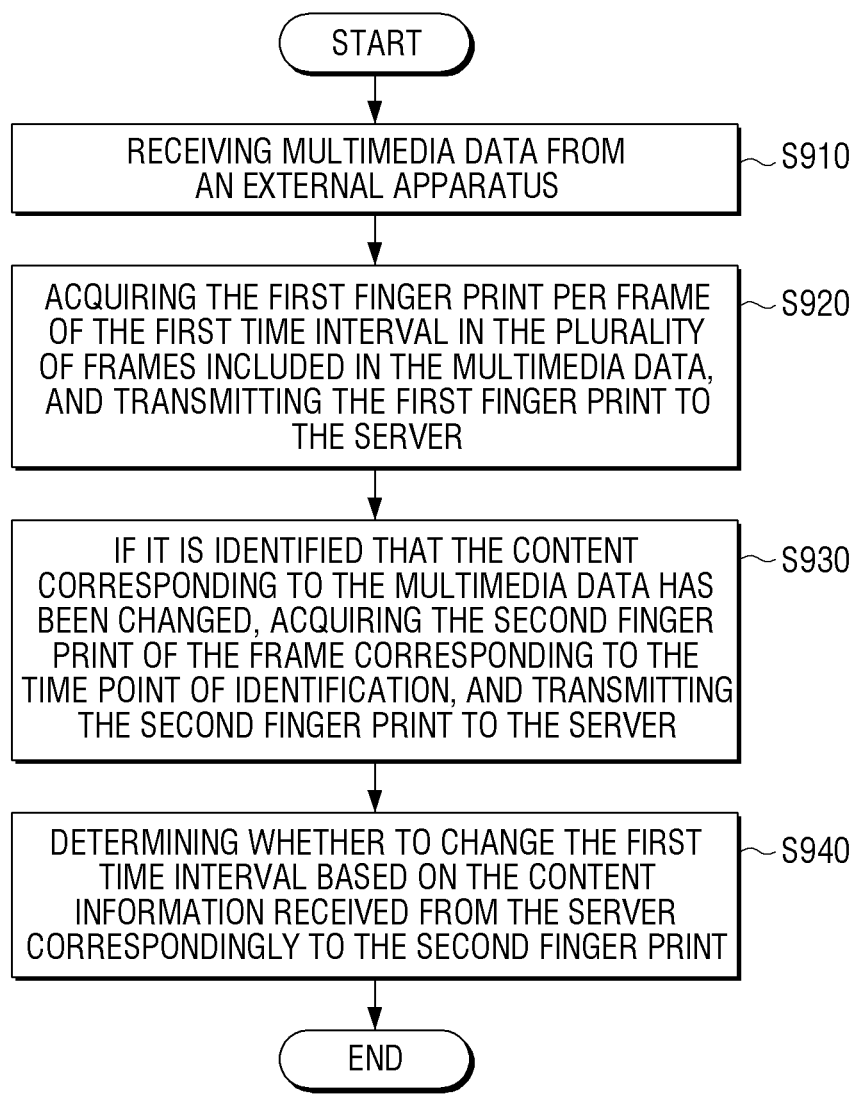
FIG. 9 is a flowchart illustrating a control method of an electronic apparatus according to an embodiment.

FIG. 9 is a flowchart illustrating a control method of an electronic apparatus according to an embodiment.

First, multimedia data is received from an external apparatus at operation S910. Then, the first finger print is acquired per frame in the first time interval in the plurality of frames included in the multimedia data, and the first finger print is transmitted to the server at operation S920. Then, if it is identified that the content corresponding to the multimedia data has been changed, the second finger print of the frame corresponding to the time point of identification is acquired, and the second finger print is transmitted to the server at operation S930. Then, it is determined whether to change the first time interval based on the content information corresponding to the second finger print being received from the server at operation S940.

Here, in the determining step S940, if the content information received from the server is the first content information, the third finger print may be acquired per frame in the second time interval that is greater than the first time interval in the plurality of frames included in the multimedia data after the time point of identification, and the third finger print may be transmitted to the server.

Also, in the determining step S940, the third finger print and the first search subject information of the third finger print may be transmitted to the server, and the first search subject information may be information indicating that the search subjects are a plurality of databases corresponding to different content types.

In addition, in the determining step S940, if the content information corresponding to the second finger print is the first content information, the fourth finger print may be acquired in at least one frame among the frames in the second time interval, and the fourth finger print and the second search subject information of the fourth finger print may be transmitted to the server, and the second search subject information may be information indicating that the search subjects are some of the plurality of databases.

Here, in the determining step S940, information on the ending point of the changed content may be received from the server, and the control method may further include the step of identifying that the content has been changed to another content based on the information on the ending point.

Here, the first search subject information may include information indicating that the search subjects are a live content database, a commercial content database, a digital video recorder (DVR) content database, and a video on demand (VOD) content database, and the second search subject information may include information that the search subject is a commercial content database.

Also, the first content information may include information indicating that the type of a content corresponding to a finger print is a live content and information indicating that the channel providing the content corresponding to the finger print is one.

In the step S930 of transmitting the second finger print to the server, if at least one of an on screen display (OSD), a mute, or a predetermined screen is identified from the multimedia data, it may be identified that the content corresponding to the multimedia data has been changed.

Also, in the determining step S940, if the content information received from the server is the second content information, the first time interval of acquiring the first finger print may be maintained.

Here, the second content information may include information indicating that the type of the content corresponding to the finger print is a content excluding a live content or information indicating that there are a plurality of channels providing the content corresponding to the finger print.

According to the various embodiments of the disclosure, if the content currently received is a content of a predetermined type, the electronic apparatus may change at least one of the cycle of acquiring a finger print or the search subject database, and thereby minimize the use of the server.

In particular, according to the operations of the electronic apparatus as above, the electronic apparatus can identify a content more quickly, and the server (the data server) can reduce the load. Accordingly, the cost for maintaining the server can be reduced.

Furthermore, the embodiments described above may be implemented as software including instructions stored in machine-readable storage media, which can be read by machines (e.g., computers). Here, the machines refer to apparatuses that call instructions stored in a storage medium, and can operate according to the called instructions, and the apparatuses may include the electronic apparatus according to the aforementioned embodiments (e.g., the electronic apparatus 100). In case an instruction is executed by a processor, the processor may perform a function corresponding to the instruction by itself, or by using other components under its control. An instruction may include a code made by a compiler or a code executable by an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the method according to the various embodiments described above may be provided while being included in a computer program product. A computer program product refers to a product that can be traded between a seller and a buyer. A computer program product can be distributed on-line in the form of a storage medium that is readable by machines (e.g., a compact disc read only memory (CD-ROM)), or through an application store (e.g., play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g., a module or a program) may include a singular object or a plurality of objects. Also, the aforementioned components may include sub-components, and some of the sub-components may be omitted, or other sub components may be further included in the various embodiments. Some components (e.g., a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

Further, while the embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

What is claimed is:

1. An electronic apparatus comprising:
    a communication interface configured to communicate with an external apparatus and a server; and
    a processor configured to:
        receive multimedia data from the external apparatus through the communication interface,
        obtain a first finger print of first frames among a plurality of frames included in the multimedia data, the first frames being included in a first time interval, and control the communication interface to transmit the first finger print to the server,
        identify whether a content in the multimedia data has been changed and a time point indicating a time of identifying a change in the content,
        based on identifying that the content in the multimedia data has been changed, obtain a second finger print of a frame corresponding to the time point and a first search subject information, the first search subject information designating a range of search corresponding to the second finger print, and control the communication interface to transmit the second finger print and the first search subject information to the server,
        receive, from the server, content information corresponding to the second finger print through the communication interface, and
        determine whether to change the first time interval based on the content information.

2. The electronic apparatus of claim 1, wherein the processor is further configured to:
    based on the content information received from the server being first content information, obtain a third finger print of second frames among the plurality of frames in a second time interval, the second time interval being greater than the first time interval after the time point and control the communication interface to transmit the third finger print to the server.

3. The electronic apparatus of claim 2, wherein the processor is further configured to:
    control the communication interface to transmit the third finger print and second search subject information of the third finger print to the server, and
    wherein the second search subject information is information indicating that search subjects are a plurality of databases corresponding to different content types.

4. The electronic apparatus of claim 3, wherein the processor is further configured to:
    based on the content information received from the server being the first content information corresponding to the second finger print, obtain a fourth finger print of at least one frame among the second frames in the second time interval,
    control the communication interface to transmit the fourth finger print and third search subject information of the fourth finger print to the server, and
    wherein the third search subject information is information indicating that the search subjects are some of the plurality of databases.

5. The electronic apparatus of claim 4, wherein the processor is further configured to:
    receive information on an ending point of the changed content from the server through the communication interface, and
    identify that the content has been changed based on the information on the ending point.

6. The electronic apparatus of claim 4, wherein the second search subject information includes information indicating that the search subjects are at least one of a live content database, a commercial content database, a digital video recorder (DVR) content database, or a video on demand (VOD) content database, and
    wherein the third search subject information includes information indicating that one of the search subjects is the commercial content database.

7. The electronic apparatus of claim 2, wherein the first content information includes information indicating that a type of the content is a live content and information indicating that a number of channels providing the content is one.

8. The electronic apparatus of claim 1, wherein the processor is further configured to:
    based on at least one of an on screen display (OSD), a mute, or a predetermined screen being identified from the multimedia data, identify that the content corresponding to the multimedia data has been changed.

9. The electronic apparatus of claim 1, wherein the processor is further configured to:
    based on the content information received from the server being second content information, maintain the first time interval of obtaining the first finger print.

10. The electronic apparatus of claim 9, wherein the second content information includes information indicating that a type of the content is a content excluding a live content or information indicating that there are a plurality of channels providing the content.

11. A control method of an electronic apparatus, the method comprising:

receiving multimedia data from an external apparatus;

obtaining a first finger print of first frames among a plurality of frames included in the multimedia data, the first frames being included in a first time interval, and transmitting the first finger print to a server;

identifying whether a content in the multimedia data has been changed and a time point indicating a time of identifying a change in the content;

based on identifying that the content in the multimedia data has been changed, obtaining a second finger print of a frame corresponding to the time point and a first search subject information, the first search subject information designating a range of search corresponding to the second finger print, and transmitting the second finger print and the first search subject information to the server;

receiving, from the server, content information corresponding to the second finger print; and determining whether to change the first time interval based on the content information.

12. The control method of claim 11, wherein the determining further comprises:

based on the content information received from the server being first content information, obtaining a third finger print of second frames among the plurality of frames in a second time interval, the second time interval being greater than the first time interval after the time point and transmitting the third finger print to the server.

13. The control method of claim 12, wherein the determining further comprises:

transmitting the third finger print and second search subject information of the third finger print to the server, and wherein the second search subject information is information indicating that search subjects are a plurality of databases corresponding to different content types.

14. The control method of claim 13, wherein the determining further comprises:

based on the content information received from the server being the first content information corresponding to the second finger print, obtaining a fourth finger print of at least one frame among the second frames in the second time interval;

transmitting the fourth finger print and third search subject information of the fourth finger print to the server, and wherein the third search subject information is information indicating that the search subjects are some of the plurality of databases.

15. The control method of claim 14, wherein the determining further comprises:

receiving information on an ending point of the changed content from the server, and wherein the identifying whether the content in the multimedia data has been changed further comprises:

identifying that the content has been changed based on the information on the ending point.

16. The control method of claim 14, wherein the second search subject information includes information indicating that the search subjects are at least one of a live content database, a commercial content database, a digital video recorder (DVR) content database, or a video on demand (VOD) content database, and wherein the third search subject information includes information indicating that one of the search subjects is the commercial content database.

17. The control method of claim 12, wherein the first content information includes information indicating that a type of the content is a live content and information indicating that a number of channels providing the content is one.

18. The control method of claim 11, wherein the transmitting the second finger print to the server further comprises:

based on at least one of an on screen display (OSD), a mute, or a predetermined screen being identified from the multimedia data, identifying that the content corresponding to the multimedia data has been changed.

19. The control method of claim 11, wherein the determining further comprises:

based on the content information received from the server being second content information, maintaining the first time interval of obtaining the first finger print.

20. The control method of claim 19, wherein the second content information includes information indicating that a type of the content is a content excluding a live content or information indicating that there are a plurality of channels providing the content.

* * * * *